SUBSCRIPTION TELEVISION SYSTEM

Filed April 27, 1959 2 Sheets-Sheet 1

INVENTOR
Leroy W. Nero
BY James E. Tracy
ATTORNEY

INVENTOR
Leroy W. Nero
BY James E. Tracy
ATTORNEY

2,996,571
SUBSCRIPTION TELEVISION SYSTEM

Leroy W. Nero, Chicago, Ill., assignor to Zenith Radio Corporation, a corporation of Delaware Filed Apr. 27, 1959, Ser. No. 809,203
11 Claims. (Cl. 178—5.1)

This invention relates to a subscription television system in which a television signal is transmitted in coded form to be utilized only in subscriber receivers containing decoding equipment operated in synchronism with the coding function at the transmitter. The invention may be practiced in either a transmitter or receiver and for this reason the term "encoding" is used herein in its generic sense to encompass either coding at the transmitter or decoding at the receiver.

Subscription television systems have been developed wherein coding or scrambling of a television signal is achieved by switching, preferably at random, a multi-condition encoding device between its operating conditions. The switching occurs in accordance with a secret code schedule and each operating condition of the encoder effectively establishes the television signal in a different operating mode. For example, in a system described in Patent 2,510,046, Ellett et al., issued May 30, 1950, and assigned to the present assignee, coding is accomplished by actuating a coder between two operating conditions, the video components of a television signal being subjected to a phase inversion each time the coder is switched from one to the other of its conditions. In this way, the television signal is intermittently established in an operating mode wherein "black" portions of an image are displayed in white on the picture screen of an unauthorized receiver, and vice-versa. As another example, in Patent 2,677,719, Reeves, issued May 4, 1954, and assigned to the assignee of the present application, a system is described wherein an encoding device is switched between two operating conditions in order to alternately reverse the direction of field- or vertical-scanning to provide two different modes of operation; the picture display consequently alternates between right-side-up and upside-down presentations at an unauthorized receiver.

As still another example, Patent 2,758,153, Adler, issued August 7, 1956, also assigned to the present assignee, describes a system in which a multi-condition device, including a beam-deflection switch tube and a time delay network, is actuated between two different conditions of operation in order to subject only certain time intervals of video information to a time delay to produce a picture display at an unauthorized receiver that "jitters" back and forth at an eye-disturbing rate.

While such scrambling techniques are effective since the mode variations or changes may be made abruptly and at a random rate and therefore result in substantial destruction of image intelligence, the encoders employed may introduce into the encoded signal a spurious, undesired signal component having a wave form corresponding generally to that of the switching or encoding signal. To elucidate, if a multi-condition encoder is not perfectly balanced, when it is in one condition the signal being encoded may be operated on or treated differently than when the encoder is in another condition with the result that the output signal may have a different peak-to-peak amplitude and/or average level in one mode than in another.

Even though an encoder may be balanced when made, an unbalance may result, giving rise to an undesired switching component in the output signal, due to any one or more of several different factors. For example, temperature variations of the various circuit elements involved may cause an appreciable variance of their electrical characteristics. If the encoder takes the form of a two-condition electronic switch, such as the beam-deflection device in the Adler patent, and a delay line, an equalizing network is usually included to match the attenuation of the delay line so that the peak-to-peak amplitude of the encoded signal is the same for both conditions of the switch, namely the same whether the delay line is used or not.

As another example, if the control potentials applied to a multi-condition encoder vary, the operating characteristics may likewise change or drift. Assume, for instance, that the plate current in a beam-deflection type encoder changes with changes in operating condition, a definite switching component will manifest itself in the output.

As still another example, drifting of the operating characteristics of an encoder of the type under consideration (especially those containing switch tubes) may be effected by micro-phonics or mechanical vibrations that result in an actual displacement, be it ever so slight, of its physical elements.

The video-frequency components of a television signal occupy a relatively wide band in the frequency spectrum, extending from nearly D.C. up to 4.5 megacycles and consequently the switching or encoding signal has a significant frequency or frequencies, depending on the particular form that the switching signal takes, within the frequency range covered by the video components. Thus, the aforementioned undesired signal component occurring at the switching rate is likely to produce visible distortion that detracts from the fidelity or quality of the unscrambled video.

Of course, by extremely precise construction of encoders and by exercising very close control of their operation, it is possible to minimize the influence of such signal components to the end that no noticeable visible distortion exists. The present invention, however, provides an answer to this problem in the form of relatively inexpensive circuitry that may be manufactured by conventional mass production techniques.

It is an object of the present invention, therefore, to provide a new and improved subscription television system which is substantially free of the spurious signal components that may be experienced with the arrangements set forth above.

It is another object of the invention to provide a subscription television system which effectively avoids a super-positioning of switching-frequency fluctuations upon a translated video signal.

It is still another object of the invention to provide a new and improved subscription television system.

A subscription television system, constructed in accordance with the invention, comprises a source of a video signal having components extending over a predetermined frequency range. A multi-condition encoding device is coupled to the source and, in response to an applied signal, switches between its operating conditions to develop an encoded video signal having at least some of the video signal components established in different operating modes. There are means for applying to the encoding device a switching signal having a fundamental frequency falling in a pre-determined portion of the range to actuate the encoding device but subject to introduce into the encoded video signal an undesired component at the switching frequency. There are utilizing apparatus and means including a filter coupled between the encoding device and the utilizing apparatus for translating thereto at least some of the components of the encoded video signal lying in the frequency range outside of the aforesaid predetermined portion, thereby to remove the undesired switching component. Finally, the subscription television system comprises means including a filter coupled between the video signal source and the utilizing apparatus for translating to the utilizing apparatus at least some of the video signal components falling in the predetermined portion.

The features of this invention which are believed to be new are set forth with particularity in the appended claims. The invention, together with further objects and advantages thereof, may best be understood, however, by reference to the following description in conjunction with the accompanying drawings, and in the several figures of which like reference numerals indicate identical elements, and in which:

Figures 1, 2:
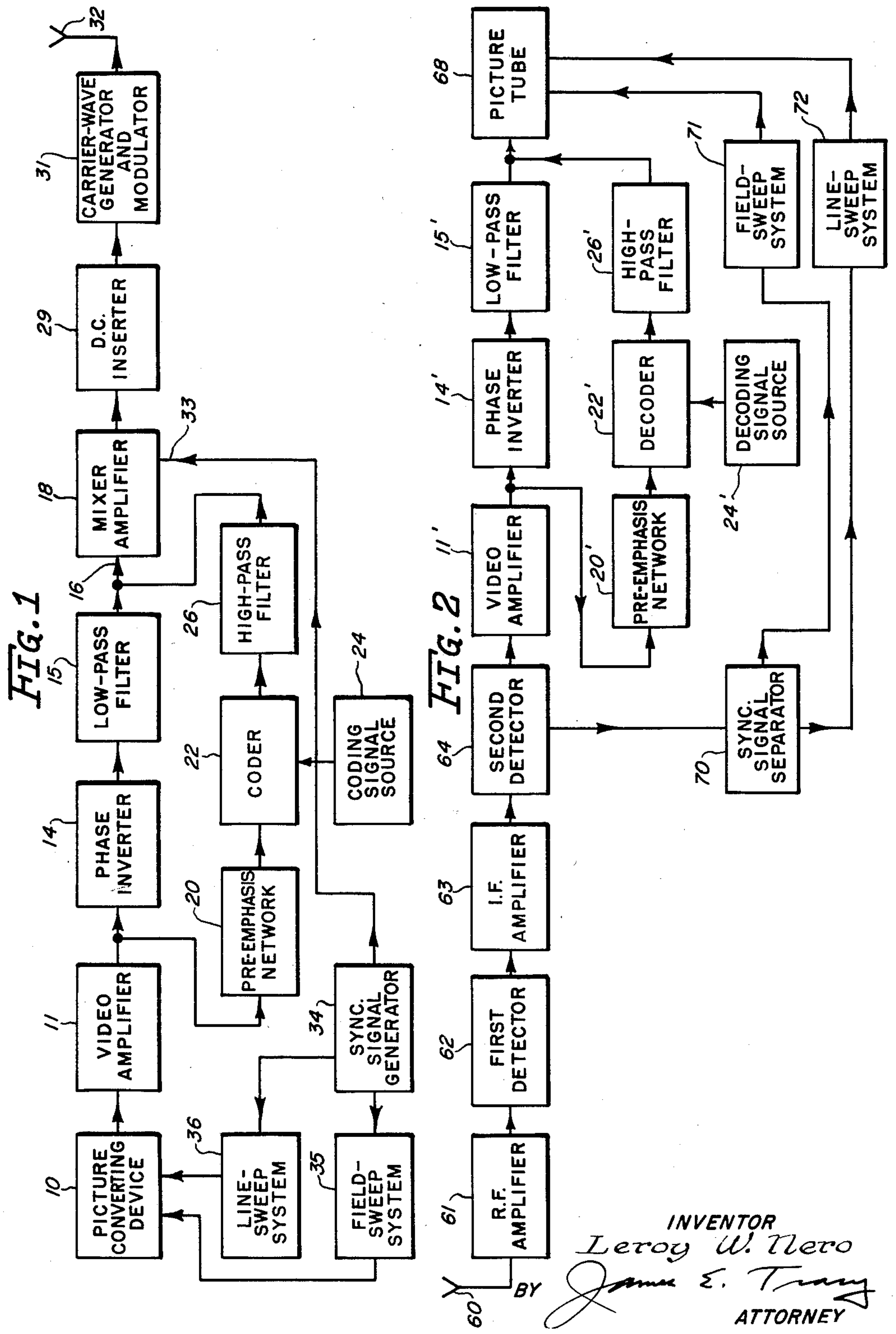
FIGURE 1 is a schematic representation of a subscription television transmitter constructed in accordance with one embodiment of the invention.
FIGURE 2 represents a subscription television receiver constructed to operate in conjunction with transmitter of FIGURE 1 and illustrates another embodiment of the invention.

Considering now the transmitter of FIGURE 1, a picture-converting device or camera tube 10 which may be of any well known construction is provided for developing a video signal representing an image to be televised. The output terminals of pick-up device 10 are connected to a conventional video amplifier 11, the output circuit of which is connected (1) through the cascade arrangement of a phase inverter 14 and a low-pass filter 15 to one pair of input terminals 16 of a mixer 18 and (2) through a pre-emphasis network 20 to one input of a coder 22.

Coder 22 may be similar to that disclosed and claimed in the aforementioned Adler Patent 2,758,153. It may comprise a beam-deflection tube having a pair of collector anodes connected respectively to a pair of output circuits which may be selectively connected to the output of pre-emphasis network 20 as the electron beam is deflected from one to the other of the two anodes. One of these output circuits includes a time-delay network or delay line so that the timing of the video signal components relative to the synchronizing signal components of the radiated television signal varies as the beam of the deflection tube is switched between its anodes. Switching between the two different operating conditions is accomplished by means of a varying actuating signal applied to coder 22.

Varying the relative timing of at least some of the video and synchronizing components from time to time achieves effective picture scrambling since conventional television receivers require a constant time relation between the video and synchronizing components to effect faithful image reproduction. In other words, if portions of the video information received at an unauthorized receiver are delayed with respect to the periodically recurring line-synchronizing components during certain spaced intervals and this delay is not compensated during those intervals, the resulting picture display on the picture tube shifts or jitters back and forth.

Coder 22 may thus be characterized as a multi-condition encoding device which, in response to an applied signal, is switched between its operating conditions to develop an encoded video signal with at least some of the video signal components established in different operating modes, namely with at least some of the video signal components occurring during certain spaced time intervals delayed with respect to the synchronizing components.

In order to switch coder 22 between its operating conditions, a coding signal source 24 is coupled to its deflection electrodes. The manner in which a varying switching signal may be developed and the manner in which information concerning its make-up is conveyed to subscriber receivers are entirely immaterial to the present invention. Patent 2,852,598, Roschke, issued September 16, 1948, and assigned to the same assignee as the present application, shows one coding signal source suitable for use as unit 24. In the code signal generator of the Roschke patent, a counting device in the form of a 30:1 multivibrator responds to line-synchronizing pulses to develop a rectangular signal having amplitude changes occurring during line-trace intervals. During the field- or vertical-retrace intervals, coding pulses or bursts are developed and supplied to various input circuits of a bi-stable multivibrator to effect actuation thereof, preferably in random fashion. The counting device is rephased during each field-retrace interval under the control of the bi-stable multivibrator, and thus the rectangular shaped switching signal from the counter is phase modulated in a random manner. Since there are 15,750 horizontal scanning lines per second under present United States standards and since the rectangular signal developed in the 30:1 counting device executes an amplitude change after each interval of 15 line-trace intervals, or 30 lines for a complete cycle, the frequency of the rectangular shaped signal is 15,750 divided by 30 or 525 cycles per second. The code signal pulses may be transmitted along with the video signal during field-retrace intervals to facilitate the proper phasing of a similar code generator at the receiver.

Attention is also directed to copending applications Serial No. 370,174, filed July 24, 1953, and issued October 27, 1959, as Patent 2,910,526, in the name of Walter S. Druz, and Serial No. 479,170, filed December 31, 1954, in the name of Erwin M. Roschke, both of which are assigned to the present assignee, and each of which discloses a coding signal source suitable for use as unit 24. The coding or switching signals developed in any one of the described arrangements for unit 24 exhibit fundamental as well as harmonic frequencies lying in the frequency range covered by the video signal and will result in visible distortion if a switching frequency component is superimposed on the coded video developed in the output of coder 22 for transmission to the subscriber receivers.

The output terminals of coder 22 are connected through a high-pass filter 26 to the same input 16 of mixer amplifier 18 to which the output of filter 15 is coupled. Filters 15 and 26 are, of course, constructed to exhibit particular frequency response characteristics, illustrated in FIGURE 3, and pre-emphasis network 20 is constructed to emphasize a certain band of video signal components in the video range in a manner to be explained.

Mixer 18 is coupled through a direct current inserter 29 to a carrier wave generator and modulator 31 which in turn connects to an antenna 32. The transmitter also includes a synchronizing signal generator 34 which supplies the customary field- and line-synchronizing components and associated pedestal and blanking components to mixer 18 via another input circuit 33 thereof. Generator 34 further supplies field- and line-drive pulses to a field-sweep system 35 and to a line-sweep system 36, respectively. The output terminals of sweep systems 35 and 36 are connected respectively to the field- and line-deflection elements (not shown) associated with picture converting device 10.

Figure 3:
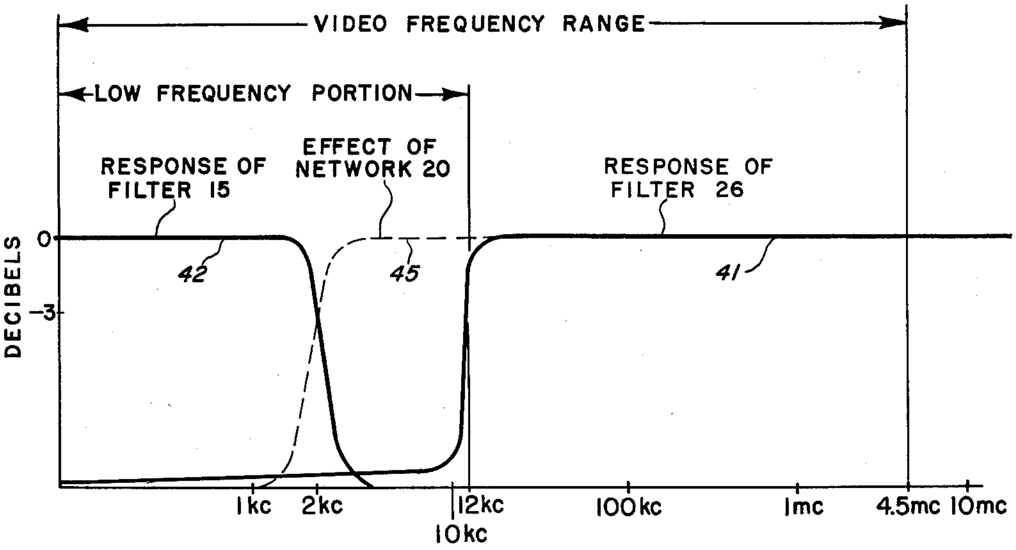
FIGURE 3 depicts the frequency response characteristics of some of the components included in the transmitter and receiver.

Turning now to an operational description of the subscription television transmitter of FIGURE 1, camera tube 10 develops a video signal representing the program information to be televised and this signal, which has components extending over a frequency range from 0 to 4.5 megacycles, after amplification in video amplifier 11 is supplied to both phase inverter 14 and pre-emphasis network 20. For reasons which will be appreciated later, pre-emphasis network 20 is constructed to emphasize substantially all of the video signal components falling in a predetermined low frequency portion of the 0–4.5 mc. frequency range with respect to the video components lying above that low frequency portion. In the described embodiment, that low frequency portion extends to approximately 12 kilocycles as indicated in FIGURE 3.

The video components after pre-emphasis in network 20 are then applied to coder 22. Meanwhile, coding signal source 24 develops a rectangular shaped switching signal having a fundamental frequency and harmonics all falling in the low frequency portion of the video frequency range. No matter which one of the various coding signal generators suggested hereinbefore for source 24 is actually employed, this condition exists. For example, if the code generator of the aforementioned Roschke Patent 2,852,598 is utilized for source 24, the fundamental frequency will be 525 cycles per second, as stated previously, and of course that frequency as well as a multitude of harmonics thereof all fall below 12 kilocycles.

The rectangular shaped switching signal from source 24 is applied to the deflection control elements of coder 22 and effectively switches the coder from one to the other of its two operating conditions in response to each amplitude excursion of the switching signal. The delay line included in coder 22 is thus alternately interposed, at the switching frequency, in the video channel extending from network 20 to filter 26 in order to effectively vary the time relationship between some of the video and synchronizing components.

As mentioned previously, unfortunately a switching frequency component may manifest itself in the output of coder 22, resulting in or giving rise to undesired distortion. The principal cause of such a switching component when coder 22 takes the form of an electronic switch and a time delay network may be attributed to the unbalance caused by a change in resistance of the delay line with temperature changes. It is not uncommon at all for the operating temperature of the coder under discussion to vary over a period of a couple of hours. At the transmitter the undesired switching component may result in a change in the peak-to-peak amplitude of the video information from one mode to the next and/or may effect a change in the average video level from one mode to the next.

In order to delete or remove the undesired switching component from the coded video signal developed in the output of coder 22, high-pass filter 26 is constructed to exhibit a frequency response characteristic 41 as illustrated in FIGURE 3. Specifically, characteristic 41 has its low frequency cutoff point, namely the frequency at which the response is down 3 decibels, at approximately 12 kilocycles. Thus, filter 26 essentially translates only the coded video components lying above the low frequency portion, thereby attenuating the switching component and its harmonics to the extent that they are of negligible amplitude at the output of the filter.

Before the effect of pre-emphasis network 20 is discussed, it is expedient to explain the function of phase inverter 14 and filter 15. All of the video signal components are phase inverted in unit 14 merely to match the phase inversion incidentally taking place in coder 22. Low-pass filter 15 is constructed to have a high frequency cutoff point, namely, the point at which the response is down 3 decibels, at 2 kilocycles, as shown by response curve 42 in FIGURE 3. From a study of response characteristics 41 and 42 it will be noted that all of the video components, with the exception of that band lying approximately between 2 and 12 kilocycles, are translated to input 16 of mixer amplifier 18. By the employment of the most sophisticated filter manufacturing techniques it is conceivable that this band of video frequencies may be narrowed by providing sharper cut off characteristics and by bringing the low frequency cutoff point of filter 26 closer to the high frequency cutoff point of filter 15.

However, one of the features of the present invention permits the use of rather conventional filters which do not have extremely abrupt cutoff characteristics. The video frequencies between 2 and 12 kilocycles are translated to mixer 18 due to the function of pre-emphasis network 20 even in spite of the attenuation of that band achieved by filter 26. This network emphasizes or exalts some of the components in the low frequency portion, namely the frequencies between 2 and 12 kilocycles, with respect to the frequencies above that portion. Thus, the amplitude of the 2–12 kilocycle video components at the input of filter 26 may be, for example, five times that of the video signals above 12 kilocycles.

It will be noted in FIGURE 3 that response 41, while extremely low below 12 kilocycles, is still not zero and thus the 2–12 kc. video signals, although attenuated considerably by filter 26, nevertheless appear in the output of filter 26. By proper choice of circuit parameters the amplitude of the 2–12 kc. video components at the output of filter 26 may be made approximately equal to that of the video components above 12 kc. and yet the switching components are deleted because they are introduced subsequent to the pre-emphasis network. The effect of network 20 is illustrated by dashed response curve 45 in FIGURE 3. In a sense, the pre-emphasis function lowers the cutoff frequency of high-pass filter 26 for the video components so as to match the high frequency cutoff point of low-pass filter 15, without lowering the cutoff frequency of filter 26 for the undesired switching component and its harmonics because pre-emphasis is accomplished before coding where the switching components may be introduced.

Considering the effect of network 20 in conjunction with the functions of filters 15 and 26, the overall response characteristic of the system "looking back" from input 16 of mixer 18 is essentially flat from 0 to 4.5 megacycles.

While it is true that some of the low frequency video components are translated to mixer 18 in uncoded rather than coded form, as a practical matter for many different types of coding, such as line jitter type coding, there is a negligible effect on those low frequencies. Assuming that the delay line incorporated in coder 22 introduces a time delay of approximately 2 microseconds, delaying a video signal component of, for example, 5 kilocycles causes only a 3.6 degree phase shift. Of course, for lower frequency video signals the degree of phase change is even less. Consequently, even though the low frequency video signals are not coded, there is no material effect on the scrambling attained.

Mixer 18 also receives the usual line- and field-synchronizing and blanking pulses from generator 34 over input 33 so that a coded composite video signal is developed therein. That signal is adjusted as to background level in direct current inserter 29 and is amplitude modulated on a carrier wave in unit 31. The modulated carrier is then applied to antenna 32 from which it is radiated to subscriber receivers. Sweep systems 35 and 36 are synchronized by generator 34 in well known manner. The sound portion of the transmitter has been omitted to avoid encumbering the application. It may be conventional or it may include sound coding apparatus.

By way of summary, video amplifier 11 constitutes a source of a video signal having components extending over a predetermined frequency range, namely from 0 to 4.5 megacycles. Multi-condition encoding device 22 is coupled, by way of pre-emphasis network 20, to source 11 and, in response to an applied signal, is switchable between its operating conditions to develop an encoded video signal with at least some of the video signal components established in different modes. As illustrated, all of the video components are subjected to a coding function. Coding signal source 24 applies to encoding device 22 a varying signal (specifically, a rectangular shaped signal) having a switching frequency falling in a predetermined low frequency portion (0–12 kc.) of the video frequency range to actuate the encoder. Coder 22 is subject, under certain operating conditions, to introduce into the encoded video signal an undesired component at the switching frequency. Units 18 and 29—32 may be considered utilizing apparatus. High-pass filter 26 and its coupling circuitry between coder 22 and mixer 18 constitute means including a high-pass filter coupled between the encoding device and the utilizing apparatus for translating to the apparatus the components in the encoded video signal lying in the frequency range above the aforementioned low frequency portion. In this way, the undesired switching component which lies within that low frequency portion is removed. Finally, low-pass filter 15, phase inverter 14 and the coupling circuitry between video amplifier 11 and mixer 18 may be considered means including a low-pass filter coupled between the video signal source and the utilizing apparatus for translating to the apparatus at least some of the video signal components falling in the low frequency portion of the video range. As described, substantially only the video components below 2 kilocycles are forwarded to mixer 18 through filter 15.

Turning now to the subscription television receiver of FIGURE 2 which is constructed to decode the coded video signals radiated by the transmitter of FIGURE 1, an antenna 60 is connected through the cascade arrangement of a radio-frequency amplifier 61, a first detector 62, and an intermediate-frequency amplifier 63 to a second detector 64. The output of detector 64 is connected through the cascade arrangement of a video amplifier 11', a phase inverter 14', and a low-pass filter 15' to the input electrodes of a cathode-ray image reproducer or picture tube 68. The output of video amplifier 11' is also connected to a pre-emphasis network 20' having its output terminals connected to an encoding device or decoder 22', the output terminals of which are connected through a high-pass filter 26' to the same input of picture tube 68 to which the output of filter 15' is connected. A decoding signal source 24' is coupled to another input of decoder 22.

Decoder 22' is controlled to operate in a complementary fashion to coder 22 in order to compensate for variations in the timing of the video and synchronizing components of the received television signal. Specifically, when a delay is introduced at the transmitter between a line-synchronizing component and at least part of the video information occurring during the immediately following line-trace interval, the received video is translated through decoder 22' with no delay. On the other hand, when no delay is introduced at the transmitter between line-synchronizing and video components, a delay is introduced in decoder 22'.

Second detector 64 is also coupled to a synchronizing signal separator 70 having output circuits connected to a field-sweep system 71 and to a line-sweep system 72 connected in turn to appropriate deflection elements (not shown) associated with picture tube 68.

In the operation of the described receiver, the coded television signal is picked up by antenna 60, amplified in radio-frequency amplifier 61 and demodulated or heterodyned to the selected intermediate frequency in detector 62. The intermediate-frequency signal thereby developed is amplified in amplifier 63 and detected in detector 64 to produce a coded composite video signal. This latter signal is then operated on by units 11'—26' in the same but complementary manner as the uncoded video signal is operated on by units 11—26 in the transmitter in order to supply to the input of picture tube 68 a decoded video signal to realize intelligible picture reproduction. Sweep systems 71 and 72 are, of course, operated in conventional manner.

Since coding of the low frequency video components adds no noticeable scrambling or muss-up to the picture display at an unauthorized receiver, the invention may or may not be practiced at the transmitter but it is still desirable for inclusion at the receiver. This obtains since decoder 22' is likely to introduce into the decoded video signal a component at the switching frequency, resulting in an annoying flicker, regardless of what takes place in the transmitter. If the arrangement of the present invention is not included in the transmitter and all of the video components, including those up to 2 kc., are therefore transmitted in coded form, those low frequencies may still by-pass the decoder because they contribute nothing with respect to scrambling and thus need not be unscrambled.

As is the case with the transmitter as mentioned hereinbefore the sound section of the receiver has not been shown to avoid encumbering the drawings. If the audio information is not subjected to a coding function in the transmitter then, of course, the sound section of the receiver of FIGURE 2 may be conventional. On the other hand, if the audio signal is coded in the transmitter a corresponding decoding function must take place in the receiver.

As also stated previously, phase inverter 14, and of course 14', are included merely to match the phase inversions occurring in coder 22 and decoder 22'. Obviously, a separate phase inversion stage is not essential. For example, video amplifiers 11 and 11' may be constructed to also serve as phase splitters to provide the video signal components at two different output terminals, the components derived at one being 180° out of phase with those derived at the other. Specifically, each video amplifier may comprise a triode with its plate coupled directly to low-pass filter 15 or 15' and its cathode coupled to pre-emphasis network 20 or 20'. As another example, the same output of the video amplifier may be coupled to both the low-pass filter and the pre-emphasis network with the outputs of low-pass filter 15 or 15' and high-pass filter 26 or 26' applied to separate inputs of either mixer amplifier 18 or picture tube 68 to effectively drive those stages in push-pull. The output of the low-pass filter may be coupled to the cathode of unit 18 or 68 while the output of the high-pass filter may be coupled to the grid of either one of those units.

Figure 4:
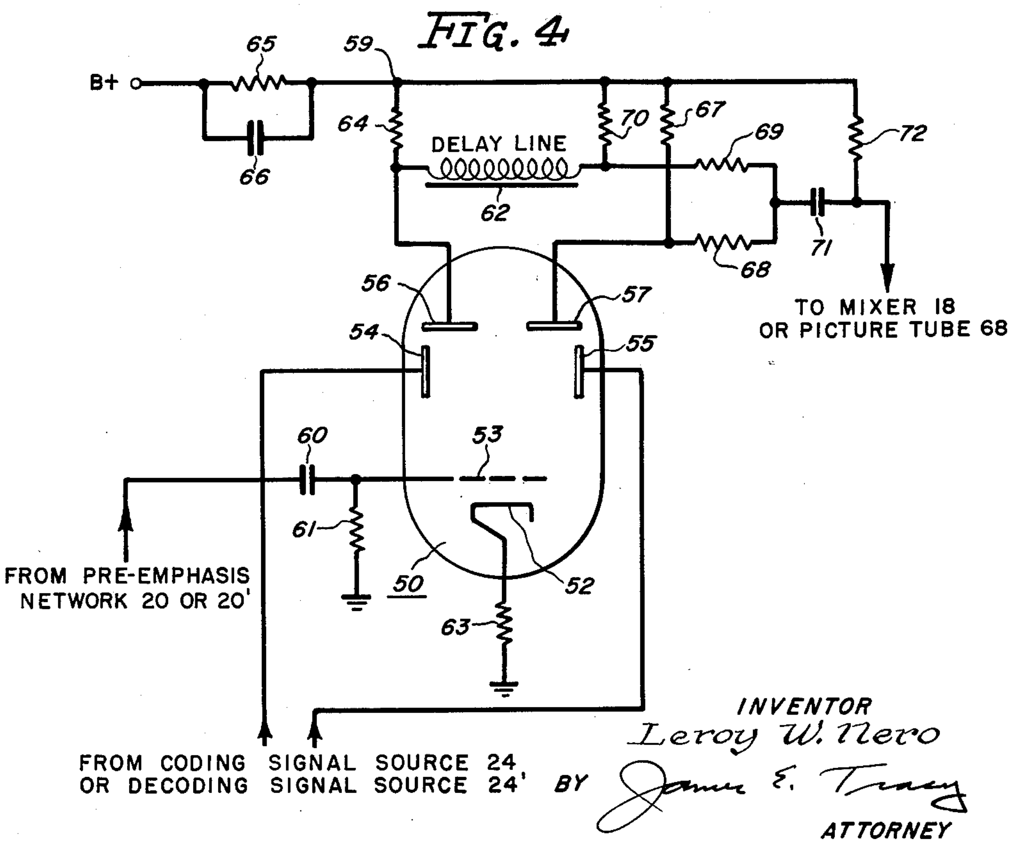
FIGURE 4 illustrates a particular detailed form that portions of both the transmitter and receiver may take and represents a further embodiment.

Reference is now made to FIGURE 4 which illustrates in detail one particular form that the combination of elements 14, 15, 22 and 26, and their corresponding primed numbered elements, may take. There, a beam-deflection tube 50 comprises a cathode 52, an intensity control grid 53, a pair of deflection-control electrodes 54, 55 and a pair of output anodes or target electrodes 56, 57. Control grid 53 is coupled to the output circuit of either pre-emphasis network 20 or 20', depending on whether the arrangement of FIGURE 4 is incorporated in the transmitter of FIGURE 1 or the receiver of FIGURE 2, through a coupling condenser 60. Grid 53 is returned to ground through a grid-leak resistor 61. Cathode 52 is connected to ground through a cathode resistor 63.

Target electrode 56 is coupled to the input terminal of a delay line 62 and also through a pair of series-connected resistors 64, 65 to the positive terminal of a source of unidirectional operating potential B+, the negative terminal of which is connected to ground. Resistor 65 is by-passed by a condenser 66. Target anode 57 is connected to the junction 59 of resistor 64 and 65 through a resistor 67, across which is bridged the series arrangement of three resistors, 68, 69 and 70 in the order named. The junction of resistors 69 and 70 is connected to the output terminal of delay line 62, while the junction of resistors 68 and 69 is coupled through a condenser 71 to the input of either mixer 18 or picture tube 68. The common junction 59 of resistors 64, 65, 67 and 70 is coupled through a resistor 72 also to the input of either units 18 or 68.

Coding signal source 24 and decoding signal source 24' are each provided with two output terminals from which switching signals of opposed phases are derived. Each of the two outputs of source 24 or 24′ is therefore coupled to an assigned one of deflection electrodes 54, 55. Resistor 64 provides an input termination resistance for the delay line while resistors 67—70 collectively provide an output termination resistance in order that the delay line may be non-reflecting.

Ignoring for the moment the effect of some of the circuit elements in FIGURE 4, the video signal developed at the output terminals of either pre-emphasis network 20 or 20′ is applied to control grid 53 and intensity modulates the electron beam in tube 50. During intervals when the beam is directed to target 56, resistors 64 and 65 provide a load circuit and the video signal is translated to mixer 18 or picture tube 68 via a path including delay line 62; consequently, the video is delayed. However, when the beam is directed to target electrode 57, resistors 67—70 and 65 essentially provide a load circuit and the video signal is applied directly to units 18 or 68 with no appreciable delay. The electron beam is deflected between anodes 56 and 57 by means of the beam-deflection control or switching signal applied to deflection elements 54, 55 by source 24 or 24′. Delay line 62 is thus alternately included and excluded in the video translating channel in order to achieve coding at the transmitter or decoding at the receiver. As thus far described, the arrangement of FIGURE 4 operates essentially as is dsescribed in the aforementioned Adler Patent 2,758,153.

In accordance with the invention, the electrical size of resistor 65 and condenser 66 is selected in order that the combination may constitute a low-pass filter having the frequency response of filters 15 and 15′ described previously. In other words, resistor 65 and condenser 66 performs the same function as either low-pass filter 15 or 15′. The parameters of condenser 71 and resistor 72, on the other hand, are selected to constitute either high-pass filter 26 or 26′.

Since resistor 65 and condenser 66 provide low-pass filter action, junction 59 is essentially at ground potential with respect to the high frequency video components lying above approximately 2 kilocycles. Thus, no matter which one of collector anodes 56, 57 instantaneously receives the electron beam in tube 50, none of the high frequency video is dropped across resistor 65 and condenser 66, whereas the low-frequency components are. Consequently, the video components up to 2 kilocycles always appear at junction 59 in uncoded form and are translated through resistor 72 to either mixer 18 or picture tube 68. The low frequency components developed elsewhere in FIGURE 4 are prevented from reaching mixer 18 or picture tube 68 by virtue of the blocking action of condenser 71. By the same token, if any undesired switching component is developed due to an unbalance of the encoding apparatus, that switching component will also be blocked by condenser 71.

The high frequency video components are developed at the junction of resistors 68 and 69 for translation through condenser 71 to units 18 or 68 and are coded or decoded, whatever the case may be.

It should be noted that phase inverter 14 or 14′ has effectively been incorporated into the arrangement of FIGURE 4 because the low frequency video components appear at junction 59 in opposite phase to the same components as applied to grid 53 and thus both the low and high components are of the same phase at the input of mixer 18 or picture tube 68.

The invention provides, therefore, an improved subscription television system which permits the employment of a multi-condition encoding device that may be subject to introduce an undesired coding signal component of a frequency lying in the video range into the encoded video signal developed thereby, and yet this undesired component is effectively deleted without losing any video information.

While particular embodiments of the invention have been shown and described, modifications may be made, and it is intended in the appended claims to cover all such modifications as may fall within the true spirit and scope of the invention.

I claim:

1. A subscription television system comprising: a source of a video signal having components extending over a predetermined frequency range; a multi-condition encoding device coupled to said source and, responsive to an applied signal, to switch between its operating conditions and develop an encoded video signal having at least some of said video signal components established in different modes; means for applying to said encoding device a switching signal having a fundamental frequency in a predetermined low frequency portion of said range to actuate said encoding device but subject to introduce into said encoded video signal an undesired component at said switching frequency; utilizing apparatus; means including a high-pass filter coupled between said encoding device and said utilizing apparatus for translating to said apparatus the components of said encoded video signal lying in said frequency range above said low frequency portion, thereby to remove the undesired switching component; and means including a low-pass filter coupled between said video signal source and said utilizing apparatus for translating to said apparatus at least some of said video signal components falling in said low frequency portion.

2. A subscription television system comprising: a source of a video signal having components extending over a predetermined frequency range; an encoding device coupled to said video signal source and having a plurality of operating conditions each of which establishes said video signal components in a different mode; a source of an alternating encoding signal having a switching frequency falling in a predetermined low frequency portion of said range; means for applying said alternating signal to said encoding device to switch said encoding device between its operating conditions at said switching frequency to develop at the output of said encoding device an encoded video signal subject to contain an undesired component at said switching frequency; utilizing apparatus; means including a high-pass filter coupled between said encoding device and said utilizing apparatus for translating to said apparatus the components in said encoded video signal lying in said frequency range above said low frequency portion, thereby to remove the undesired switching component; and means including a low-pass filter coupled between said video signal source and said utilizing apparatus for translating to said apparatus at least some of said video signal components falling in said low frequency portion.

3. A subscription television system comprising: a source of a video signal having components extending over a predetermined frequency range; a multi-condition encoding device coupled to said source and, responsive to an applied signal, switchable between its operating conditions to develop an encoded video signal with at least some of said video signal components occurring during certain spaced time intervals delayed with respect to the same components occurring during other time intervals; means for applying to said encoding device a switching signal having a fundamental frequency falling in a predetermined low frequency portion of said range to actuate said encoding device but subject to introduce into said encoded video signal an undesired component at said switching frequency; utilizing apparatus; means including a high-pass filter coupled between said encoding device and said utilizing apparatus for translating to said apparatus the components of said encoded video signal lying in said frequency range above said low frequency portion, thereby to remove the undesired switching component; and means including a low-pass filter coupled between said video signal source and said utilizing apparatus for translating to said apparatus at least some of said video signal components falling in said low frequency portion.

4. A subscription television system for translating a television signal including synchronizing and video signal components extending over a predetermined frequency range, said system comprising: means for developing said video signal components; a multi-condition encoding device coupled to said developing means and, responsive to an applied signal, switchable between its operating conditions for altering the time relationship between said synchronizing and said video signal components to develop an encoded video signal; means for applying to said encoding device a switching signal having a fundamental frequency falling in a predetermined low frequency portion of said range to actuate said encoding device but subject to introduce into said encoded video signal an undesired component at said switching frequency; utilizing apparatus; means including a high-pass filter coupled between said encoding device and said utilizing apparatus for translating to said apparatus the components of said encoded video signal lying in said frequency range above said low frequency portion, thereby to remove the undesired switching component; and means including a low-pass filter coupled between said video signal developing means and said utilizing apparatus for translating to said apparatus at least some of said video signal components falling in said low frequency portion.

5. A subscription television system comprising: a source of a video signal having components extending over a predetermined frequency range; an encoding device coupled to said video signal source and having a plurality of operating conditions each of which establishes said video signal components in a different mode; a source of a rectangular shaped switching signal with its amplitude variations representing a switching frequency falling in a predetermined low frequency portion of said range; means for applying said switching signal to said encoding device to switch said encoding device from one to another of its operating conditions in response to each amplitude variation of said switching signal to develop at the output of said encoding device an encoded video signal but subject to containing an undesired component at said switching frequency; utilizing apparatus; means including a high-pass filter coupled between said encoding device and said utilizing apparatus for translating to said apparatus the components in said encoded video signal lying in said frequency range above said low frequency portion, thereby to remove the undesired switching component; and means including a low-pass filter coupled between said video signal source and said utilizing apparatus for translating to said apparatus at least some of said video signal components falling in said low frequency portion.

6. A subscription television system comprising: a source of a video signal having components extending over a predetermined frequency range; freguency-selective means coupled to said source for effectively emphasizing at least some of said video signal components falling in a predetermined low frequency portion of said range with respect to said video signal components lying above said low frequency portion; a multi-condition encoding device coupled to said frequency-selective means and, responsive to an applied signal, switchable between its operating conditions to develop an encoded video signal with at least some of said video signal components established in different modes; means for applying to said encoding device a switching signal having a fundamental frequency falling in said predetermined low frequency portion of said range to actuate said encoding device but subject to introduce into said encoded video signal an undesired component at said switching frequency; utilizing apparatus; means including a high-pass filter coupled between said encoding device and said utilizing apparatus for translating to said apparatus the components of said encoded video signal lying in said frequency range above said low frequency portion and also at least some of said video signal components emphasized by said frequency-selective means, thereby to remove the undesired switching component; and means including a low-pass filter coupled between said video signal source and said utilizing apparatus for translating to said apparatus at least some of said video signal components falling in said low frequency portion.

7. A subscription television system comprising: a source of a video signal having components extending over a predetermined frequency range; a pre-emphasis network coupled to said source for effectively emphasizing at least some of said video signal components falling in a predetermined low frequency portion of said range with respect to said video signal components lying above said low frequency portion; a multi-condition encoding device coupled to said pre-emphasis network and, responsive to an applied signal, switchable between its operating conditions to develop an encoded video signal with at least some of said video signal components established in different modes; means for applying to said encoding device a switching signal having a fundamental frequency falling in said predetermined low frequency portion of said range to actuate said encoding device but subject to introduce into said encoded video signal an undesired component at said switching frequency; utilizing apparatus; means including a high-pass filter coupled between said encoding device and said utilizing apparatus for translating to said apparatus the components of said encoded video signal lying in said frequency range above said low frequency portion and also at least some of said video signal components emphasized by said pre-emphasis network, thereby to remove the undesired switching component; and means including a low-pass filter coupled between said video signal source and said utilizing apparatus for translating to said apparatus at least some of said video signal components falling in said low frequency portion.

8. A subscription television system comprising: a source of a video signal having components extending over a predetermined frequency range; frequency-selective means coupled to said source for effectively emphasizing at least some of said video signal components falling in a predetermined low frequency portion of said range with respect to said video signal components lying above said low frequency portion; an encoding device coupled to said frequency-selective means and having a plurality of operating conditions each of which establishes at least some of said video signal components in a different mode; a source of a varying signal having a fundamental frequency and several harmonics thereof all falling in said low frequency portion of said range; means for supplying said varying signal to said encoding device to switch said encoding device between its operating conditions at said fundamental frequency to develop at the output of said encoding device an encoded video signal but subject to containing undesired components at said fundamental frequency and at said several harmonics thereof; utilizing apparatus; means including a high-pass filter coupled between said encoding device and said utilizing apparatus for translating to said apparatus the components in said encoded video signal lying in said frequency range above said low frequency portion and also at least some of said video signal components emphasized by said frequency-selective means, thereby to remove the undesired switching components; and means including a low-pass filter coupled between said video signal source and said utilizing apparatus for translating to said apparatus only said video signal components falling in a section of said low frequency portion at the low frequency end thereof.

9. A subscription television transmitter comprising: a source of a video signal having components extending over a predetermined frequency range; a multi-condition coding device coupled to said source and, responsive to an applied signal, switchable between its operating conditions to develop a coded video signal with at least some of said video signal components established in different operating modes; means for applying to said coding device a switching signal having a fundamental frequency falling in a predetermined low frequency portion of said range to actuate said coding device but subject to introduce into said coded video signal an undesired component at said switching frequency; utilizing apparatus; means including a high-pass filter coupled between said coding device and said utilizing apparatus for translating to said apparatus the components of said coded video signal lying in said frequency range above said low frequency portion, thereby to remove the undesired switching component; and means including a low-pass filter coupled between said video signal source and said utilizing apparatus for translating to said apparatus at least some of said video signal components falling in said low frequency portion.

10. A subscription television receiver comprising: a source of a video signal having components extending over a predetermined frequency range; a multi-condition decoding device coupled to said source and, responsive to an applied signal, switchable between its operating conditions to develop a decoded video signal with at least some of said video signal components established in different operating modes; means for applying to said decoding device a switching signal having a fundamental frequency falling in a predetermined low frequency portion of said range to actuate said decoding device but subject to introduce into said decoded video signal an undesired component at said switching frequency; utilizing apparatus; means including a high-pass filter coupled between said decoding device and said utilizing apparatus for translating to said apparatus the components of said decoded video signal lying in said frequency range above said low frequency portion, thereby to remove the undesired switching component; and means including a low-pass filter coupled between said video signal source and said utilizing apparatus for translating to said apparatus at least some of said video signal components falling in said low frequency portion.

11. A subscription television system comprising: a source of a video signal having components extending over a predetermined frequency range; a multi-condition encoding device coupled to said source and responsive to an applied signal to switch between its operating conditions to develop an encoded video signal having at least some of said video signal components established in different modes; means for applying to said encoding device a switching signal, having a fundamental frequency in a predetermined portion of said frequency range, to actuate said encoding device but subject to introduce into said encoded video signal an undesired component at said switching frequency; utilizing apparatus; means including a filter coupled between said encoding device and said utilizing apparatus for translating to said apparatus at least some of the components of said encoded video signal lying in said frequency range outside of said predetermined portion, thereby to remove the undesired switching component; and means including a filter coupled between said video signal source and said utilizing apparatus for translating to said apparatus at least some of said video signal components falling in said predetermined portion.

References Cited in the file of this patent

"Frequency Modulation" (Marchand), published by Murray Hill Books, Inc. (New York, Toronto), 1958.